United States Patent [19]

Stamnitz et al.

[11] Patent Number: 4,913,507
[45] Date of Patent: Apr. 3, 1990

[54] MODE FIELD CONDITIONER

[75] Inventors: Timothy C. Stamnitz, Encinitas; Stephen D. Russell, San Diego, both of Calif.

[73] Assignee: The United States of America as represented by the Secretary of the Navy, Washington, D.C.

[21] Appl. No.: 242,466

[22] Filed: Sep. 8, 1988

[51] Int. Cl.$^4$ .................................................. G02B 6/26
[52] U.S. Cl. ............................. 350/96.15; 350/96.29; 350/96.3; 307/430
[58] Field of Search .............. 350/96.15, 96.16, 96.29, 350/96.3, 96.34; 307/430

[56] References Cited

U.S. PATENT DOCUMENTS

| | | | |
|---|---|---|---|
| 4,315,667 | 2/1982 | Nakagome et al. | 350/96.34 |
| 4,321,562 | 2/1982 | Segawa et al. | 350/96.15 |
| 4,342,499 | 8/1982 | Hicks, Jr. | 350/96.15 |
| 4,557,553 | 12/1985 | McLandrich | 350/96.15 |
| 4,616,898 | 10/1986 | Hicks, Jr. | 350/96.15 |
| 4,697,867 | 10/1987 | Blanc et al. | 350/96.10 |
| 4,699,452 | 10/1987 | Mollenauer et al. | 350/96.15 |
| 4,723,824 | 2/1988 | Shaw et al. | 350/96.15 |
| 4,723,825 | 3/1988 | Herold | 350/96.1 |
| 4,729,621 | 3/1988 | Edelman | 350/96.15 |
| 4,737,004 | 4/1988 | Amitay et al. | 350/96.15 |
| 4,742,307 | 5/1988 | Thylen | 330/4.3 |
| 4,763,975 | 8/1988 | Nolan et al. | 350/96.15 |

OTHER PUBLICATIONS

Dietrich Marcuse, "Mode Conversion in Optical Fibers with Monotonically Increasing Core Radius" appearing in *Journal of Lightwave Technology*, vol. LT-5, No. 1, Jan. 1987, pp. 125-133.

N. Amitay et al., "Optical Fiber Tapers-A Novel Approach to Self-Aligned Beam Expansion and Single-Mode Hardware" appearing in Journal of Lightwave Technology, vol. LT-5, No. 1, Jan. 1987, pp. 70-76.

K. P. Jedrezejewski et al., "Tapered-Beam Expander for Single-Mode Optical-Fibre Gap Devices" appearing in Electronics Letters, vol. 22, No. 2, Jan. 16, 1986, pp. 105-106.

Allan W. Snyder et al., Chapter 19 of publication entitled "Optical Waveguide Theory" published by Chapman and Hall, London and New York 1983, pp. 407-419.

A. R. Nelson, "Coupling Optical Waveguides by Tapers" appearing in Applied Optics, vol. 14, No. 12, Dec. 1975, pp. 3012-3015.

M. M. Fejer et al., "Laser Assisted Growth of Optical Quality Single Crystal Fibers" appearing in SPIE, vol. 460, Processing of Guided Wave Optoelectronic Materials, (1984), pp. 26-32.

(List continued on next page.)

*Primary Examiner*—William L. Sikes
*Assistant Examiner*—John Ngo
*Attorney, Agent, or Firm*—Harvey Fendelman; Thomas G. Keough

[57] ABSTRACT

The "mode field conditioner" (MFC) includes a radially contracted region in a cylindrical dielectric waveguide wherein, optical power density undergoes transition from low to high values in order to stimulate or enhance certain nonlinear optical effects or combinations of nonlinear optical effects; i.e., frequency conversions, phase transitions, polarization changes, the magnitude of which changes are proportional to the precise degree of light concentration that takes place. An intrinsic transition from linear fiber optic links to nonlinear optical transmission lines or networks can be made by an appropriate concatenation or arrangement of one or more of the suitably designed mode field conditioners. The mode field of the transmitted light may be decreased corresponding to increase power density, a phase-shift may be induced via self-phase modulation, frequency conversion may occur via stimulated Raman scattering or stimulated four-photon mixing, temporal and/or spatial pulse shaping may occur via a combination of nonlinear effects, or a rotation in the polarization or a change from linear to circular polarization or vice versa.

12 Claims, 1 Drawing Sheet

OTHER PUBLICATIONS

M. J. F. Digonnet et al., "1.064- and 1.32- μm ND:YAG Single Crystal Fiber Lasers" appearing in Journal of Lightwave Technology, vol. LT-4, No. 4, Apr. 1986, pp. 454-460.

Chinlog Lin, "Nonlinear Optics in Fibers for Fiber Measurements and Special Device Functions" appearing in Journal of Lightwave Technology, vol. LT-4, No. 8, Aug. 1986, pp. 1103-1115.

Y. R. Shen, "Stimulated Raman Scattering" appearing in Light Scattering in Solids, Cardona M., (Springer-Verlag, Berlin, Heidleburg, NY 1983), Chap. 7, pp. 283-290.

N. K. Dutta et al., "High-power gain-guided InGaAsP laser array" appearing in Applied Physics Letters, vol. 45, No. 9, Nov. 1, 1984, pp. 940-943.

M. Fazeghi et al., "CW Phase-Locked Array $Ga_{0.25}In_{0.75}As_{0.5}P_{0.5}$-InP High Power Semiconductor Laser Grown by Low-Pressure Metalorganic Chemical Vapor Deposition" appearing in Applied Physics Letters, vol. 50, No. 5, Feb. 2, 1987, pp. 230-232.

Rogers H. Stolen, "Nonlinear Properties of Optical Fibers" appearing in Optical Fiber Telecommunications, S. E. Miller and A. C. Chynoweth, Editors, Academic Press, 1979, pp. 125-150.

Rogers H. Stolen, "Nonlinearity in Fiber Transmission" appearing in Proceedings of the IEEE, vol. 68, No. 10, Oct. 1980, pp. 1232-1236.

R. G. Smith, "Optical Power Handling Capacity of Low Loss Optical Fibers as Determined by Stimulated Raman and Brillouin Scattering" appearing in Applied Optics, vol. 11, No. 11, Nov. 1972, pp. 2489-2494.

R. L. Herbst et al., "A 1.4-4 m High-Energy Angle-Tuned $LiNbO_3$ Parametric Oscillator" appearing in Applied Physics Letters, vol. 25, No. 9, Nov. 1, 1974, pp. 520-522.

A. Yariv, "The Modulation of Optical Radiation" appearing in Introduction to Optical Electronics, (Holt, Rinehart & Winston), 2nd Edition, 1976, pp. 222-239.

R. H. Stolen et al., "Phase-Matched Three-Wave Mixing in Silica Fiber Optical Waveguides" appearing in Applied Physics Letters, vol. 24, No. 7, Apr. 1, 1974, pp. 308-310.

R. H. Stolen et al., "Optical Fiber Modes Using Stimulated Four Photon Mixing" appearing in Applied Optics, vol. 15, No. 1, Jul. 1975, pp. 239-243.

K. Washio et al., "Efficient Large-Frequency-Shifted Three-Wave Mixing in Low Dispersion Wavelength Region in Single-Mode Optical Fibre" appearing in Electronics Letters, vol. 16, No. 17, Aug. 14, 1980, pp. 658-660.

Chinlon Lin et al., "Phase Matching in the Minimum-Chromatic-Dispersion Region of Single-Mode Fibers for Stimulated Four-Photon Mixing" appearing in Optics Letters, Oct. 1981, vol. 6, No. 10.

Chinlon Lin, "Designing Optical Fibers for Frequency Conversion and Optical Amplification by Stimulated Raman Scattering and Phase-Matched Four-Photon Mixing" appearing in Journal of Optical Communications, 4 (1) 1983, pp. 2-9.

J. P. Pocholle et al., "Raman and Four Photon Mixing Amplification in Single Mode Fibers" appearing in Optical Engineering, Jul./Aug. 1985, vol. 24, No. 4, pp. 600-608.

N. Anders Olsson et al., "Noise Properties of a Raman Amplifier" appearing in Journal of Lightwave Technology, vol. LT-4, No. 4, Apr. 1986, pp. 396-399.

Kennet Vilhelmsson, "Simultaneous Forward and Backward Raman Scattering in Low-Attenuation Single-Mode Fibers" appearing in Journal of Lightwave Technology, vol. LT-4, No. 4, Apr. 1986, pp. 400-404.

John Auyeung et al., "Spontaneous and Stimulated Raman Scattering in Long Low Loss Fibers" appearing in IEEE Journal of Quantum Electroncs, vol. QE-14, No. 5, May 1978, pp. 347-352.

John Auyeung et al., "Theory of CW Raman Oscillation in Optical Fibers" appearing in Journal Opt. Soc. Am., vol. 69, No. 6, Jun. 1979, pp. 803-807.

B. K. Nayer, "Optical Fibers with Organic Cores", *Nonlinerr Optics: Materials and Devices*, C. Flytzanis and J. L. Oudar, eds, Springer-Verlag, 1985, pp. 142-153.

K. Kitayana et al., "Optical Sampling Using an All-Fiber Kerr Shutter", Appl. Phys. Lett., vol. 46, (1985), pp. 623-625.

K. Kitayama et al., "Fiber-Optic Logic Gates", Appl. Phys. Lett., vol. 46, (1985), pp. 317-319.

S. R. Friberg et al., "Ultrafasf All-Optical Switching in a Dual-Core Fiber Nonline Coupler" *Appl. Phys. Lett.*, vol. 51, (1987), pp. 1135-1137.

MODE FIELD CONDITIONER

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This application is related to co-pending U.S. patent applications Ser. No. 239,158 filed Aug. 31, 1988 (NC70839) and Ser. No. 239,156 filed Aug. 31, 1988. (NC70836) for a Tapered Fiber Amplifier and an All-Fiber SFPM (stimulated four-photon mixing) Amplifier, respectively.

BACKGROUND OF THE INVENTION

Optical signal processing and the long-haul transmission of optical data through optical fiber waveguides are becoming more widespread with the continuing technical evolution and economic viability of fiber-optic communications and sensor systems. The need for equipment such as optical regenerator/repeaters, which operate on the basis of optical to electrical signal conversion, electrical signal amplification, which then modulates the laser transmitter for further optical transmission, represents an impediment to full realization of the advantages of fiber-optic transmission systems. Similarly, in the field of fiber-optic data bus networks, optical amps or attenuators are needed to match the signal levels to requirements of the optical circuit or particular circuit components, which results in a number of impediments. The full realization of the advantages of optical transmission networks is not achieved, since the input energy density requirements of each of the elements in the optical circuit may vary. Presently, there is no convenient way to transition energy density at discrete places in an optical circuit to the precise level needed to induce, for example, the nonlinear optical effects needed for proper device functioning.

Relatively high intensity optical pulses transmitted in single-mode optical fibers have been observed to experience nonlinear effects during transmission through the fibers. These nonlinear effects, that is, stimulated Raman scattering, stimulated Brillouin scattering, self-phase modulation, intensity-dependent rotation of the linear polarization state, and stimulated four-photon mixing have all been studied theoretically, and to one extent or another, have been demonstrated experimentally in the laboratory. Furthermore, certain thresholds for the onset of these effects in single-mode fibers have been established.

The need for the incorporation of devices based upon nonlinear optical propagation effects into practical optical transmission links is just beginning to be recognized. Fiber-optic waveguides are becoming increasingly useful in the laboratory as a nonlinear medium for optical amplification and optical signal processing. The small diameter of the fiber core and the long interaction length are conducive to developing nonlinear effects. Hence, all-optical devices employing fibers have been demonstrated in the lab to obtain such functions as: direct optical amplification, optical gating or switching, optical pulse shaping, short pulse generation or pulse compression, dispersion compensation or the generation of soliton pulses.

An example of a device for optical gating using single-mode birefringent fiber has been demonstrated in the laboratory (see "Fiber-Optic Logic Gate" by K. Kitayama et al., Appl. Phys. Lett., Vol. 46, No. 4, (1985), pp. 317-319). The operation of the device is based upon the intensity dependent polarization rotation in birefringent fibers.

Another nonlinear optical device is the Kerr shutter described in the article by K. Kitayama et al., "Optical Sampling Using An All-Fiber Optical Kerr Shutter", Appl. Phys. Lett., Vol. 46, No. 7, (1985), pp. 623-625. In this case, energy from the pump light is injected into a highly birefringent fiber which results in a Kerr induced phase shift in this polarization preserving fiber thereby acting as the trigger for the shutter. Subsequent optical sampling and light modulation can be utilized in, for example, optical logic gates.

A laboratory demonstration of a nonlinear coupler switch capable of substantially complete all-optical switching at sub-picosecond rates has been reported ("Ultrafast All-Optical Switching In A Dual-Core Fiber Nonlinear Coupler," S. R. Friberg et al., Appl. Phys. Lett., Vol. 51, No. 15, (1987), pp. 1135-1137). By embedding two fibers parallel and adjacent to each other in a material having a large nonlinear coefficient (intensity dependent index of refraction), a change in input intensity can cause light to be switched from one waveguide to the other at the output of the device. The critical switching power for the demonstrated coupler is 850 watts. Switching speeds are extremely high but "will probably be limited by pulse broadening due to dispersion, rather than by the speed of the nonlinearity."

In any of the envisioned applications, the ability to obtain an optimum (relatively high) energy intensity inside the core of an optical fiber cannot presently be readily established. The peak powers needed are typically 100-1000 watts. Most of the obstacles preventing practical device conceptions are related to the high peak powers needed in the nonlinear optical devices. Since the nonlinear effects are directly related to the power density versus peak power, the reduction in the required levels of peak power, while retaining the required threshold values of intensity, can be obtained in two primary ways: (1) by reducing the area over which the energy of the mode-field is distributed, and (2) by increasing the nonlinear (intensity-dependent) index of refraction.

An article by N. Amitay et. al. entitled, "Optical Fiber Tapers—A Novel Approach to Self-Aligned Beam Expansion and Single-Mode Hardware" appears in *Journal of Light Wave Technology*, Vol. LT-5, No. 1, Jan. 1987. The article examines the behavior of single mode beam expansion during propagation through an optical fiber taper. The light transitions from a smaller to a larger mode-field diameter "adiabatically"; that is, in such a manner that conversion to higher order modes and excessive loss does not occur. The retention of a single-mode is important for the potential use of optical fiber tapers in fiber-to-fiber coupling; wherein, the expanded fiber core diameter at the large end of the taper relieves several alignment problems when mated with a similarly expanded fiber taper on the end of the mating fiber. The result should be a reduced degree-of-difficulty in achieving low-loss couplings. The experimental set-up shown in FIG. 10 of the referenced article utilized a conventional lens arrangement to focus the laser beam for injection into the cleaved end of a "standard" single-mode fiber. The beam expansion and output properties of an optical fiber taper at the far end of the fiber link were studied. The article by Dietrich Marcuse, entitled, "Mode Conversion in Optical Fibers with Monotonically Increasing Core Radius", appearing in *Journal of Lightwave Technology*, Vol. LT-5, No. 1, Jan. 1987, shows by mathematical modeling, the transition through a fiber taper (in the direction of small to large core radius) without suffering mode conversion to higher order modes (leading to single-mode light loss). The paper develops methods for accurately calculating light energy loss as a function of alignment parameters when expanded tapers are fused together.

The article entitled, "Tapered-Beam Expander for Single-Mode Optical-Fiber Gap Devices", in *Electronics letters*, 16 Jan. 1986, Vol. 22, No. 2, indicates ideas for application of tapered fibers, but concerns itself primarily with the beam expansion characteristics. An earlier writing in *Applied Optics*, Vol. 14, No. 12, Dec. 1975, entitled "Coupling Optical Waveguides by Tapers", by A. R. Nelson, also emphasizes the coupling of single-mode optical waveguides via expanding tapers. An investigation of the critical coupling tolerances associated with widening the guide by means of a taper uncovers the tradeoff of reduced tolerances for transverse displacement and tighter tolerances for angular alignment.

In Chapter 19 of the publication, *Optical Waveguide Theory*, A. W. Snyder and J. D. Love, Chapman and Hall, London, N.Y. (1983), there is a theoretical background for the concept of light concentration in the linear regime, and a certain condition called the "slowness criterion". While theoretical background for light concentration in the linear regime is presented in the above reference, no practical applications (i.e., to nonlinear optical devices) or methods for incorporation into actual (undersea or field deployable) fiber optic systems are discussed. In *SPIE Vol. 460, Processing of Guided Wave Opto-electronic Materials*(1984), "Laser-assisted Growth of Optical Quality Single Crystal Fibers", concerns only the production of perfectly cylindrically shaped single crystal fibers (constant radius versus length). The crystal materials are known to have much better thermal properties than silica glass and therefore, could stand a much higher energy density level of light at their narrow end. The article by Digonnet et al., appearing in the *Journal of Light Wave Technology*, Vol. LT-4, No. 4, Apr. 1986, pg. 454–60, entitled "1.064- and 1.32-micron Nd:YAG Single Crystal Fiber Lasers" is of interest with respect to single crystal, single-mode fiber lasers.

Thus, a continuing need exists in the state of the art for a simple device or method to provide "conditioning of the mode-field" of light energy propagation for nonlinear optical devices or circuits.

SUMMARY OF THE INVENTION

The present invention is directed to providing an apparatus and method for conditioning the frequency, phase, pulse shape, and/or polarization of an optical mode field via induced changes in the mode-field diameter and corresponding intensity. Radial contraction of a cylindrical dielectric waveguide increases the optical power density of optical pulses or cw-beams traveling therethrough. The degree of power intensification achieved, for example, during pulse propagation through a radially contracted region of the optical dielectric waveguide is a function of the physical dimensions of the large and small ends of the tapered region, the contour of the taper, and the length of the region in which the gradual radial reduction occurs and is referred to as a mode-field conditioner (MFC). Optionally, a MFC design will be determined by the precise magnitude of light concentration required in a nonlinear optical circuit and/or at a given place in the optical link, in order to accommodate or induce nonlinear optical effects at the magnitude needed for proper functioning of nonlinear optical processing devices.

An object of the invention is to provide an active optical device for the initiation or enhancement of nonlinear optical effects.

An object of the invention is to provide an optical circuit interconnect device for varying the optical power density and intensification at a given point in an optical circuit.

Another object is to provide an optical mode field conditioner applied to propagating light systems to achieve required phase and/or polarization changes, frequency changes, and temporal or spatial pulse shaping via mode-field intensification.

Yet another object of the invention is to provide a general nonlinear transmission link in incorporating optical mode field conditioners to enhance optical transmission therethrough.

An object is to provide a method of optical light intensity modification for accommodating linear and nonlinear optical elements.

Yet another object is to provide a technique suitable for all-fiber and all-optical nonlinear devices, whereby, the energy density, spatial and temporal pulse profile, polarization, and phase of the optical signal may be conditioned to meet requirements of an overall "integrated-fiber" circuit.

These and other objects of the invention will become more readily apparent from the ensuing specification when taken in conjunction with the drawings and the appended claims.

DESCRIPTION OF THE PREFERRED EMBODIMENTS

Figure 1:
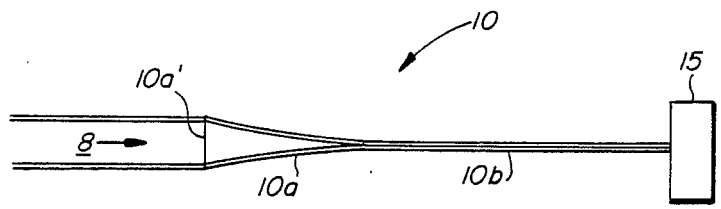
FIG. 1 depicts a mode field conditioner having a radially contracted core.
Figure 2:
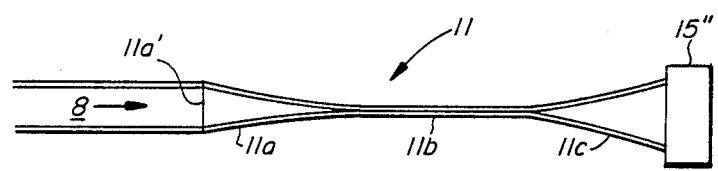
FIG. 2 shows a mode field conditioner showing a portion having a radially expanded core.
Figure 3:
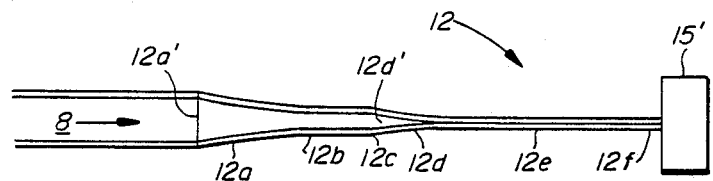
FIG. 3 illustrates a mode field conditioner having regions for coupling to an external fiber optic link which itself is provided with an appropriate mode field conditioner.

Referring now to FIGS. 1, 2 and 3 of the drawings, three different configurations of a mode field conditioner (MFC) 10, 11 and 12, respectively, receive an incoming signal via a single-mode waveguide 8 such as a fiber, and provide proper conditioning for an interconnected nonlinear device 15, 15″, or 15′. Note that the incoming signal 8 need not be confined to a fiber or waveguide, but may in fact be a laser beam propagating in air or vacuum towards an enlarged endface (10a′, 11a′, or 12a′). Furthermore, the interconnected nonlinear device 15, 15″, or 15′ may be merely a length of transmission fiber, a segment of optical waveguide performing an active nonlinear function within the circuit, or an integrated nonlinear fiber-optic device (the simplest case being a detector).

Each MFC is fabricated of a relatively long (with respect to the wavelength of light), radially contracted, funnel-shaped region of a cylindrical dielectric waveguide 10a or 11a in FIGS. 1 and 2, or 12a and 12d in FIG. 3.

The taper of the waveguide of the MFC is a gradual taper [whether constructed from silica glass fiber, glass fiber with an organic crystalline core, fluoride glasses (i.e., $ZrF_4$-based glass or other metallic halide optical fibers), or single crystal fiber] fabricated in accordance with a "slowness criteria" analogous to that described in Chapter 19 of the book by Snyder and Love, *Optical Waveguide Theory*. The gradual taper of the mode field conditioner effects an adiabatic transfer of energy; and the taper is not steeper than the gradual taper as established in the Snyder writing.

Most of the capabilities of the three MFC's depicted ordinarily will be realized in the form of a single mode-optical fiber constructed with state-of-the-art, highly purified silica glass or with core dopant materials appropriate to enhance particular nonlinear effects. Organic crystalline cores are likely for nonlinear devices requiring high response. Other optical glasses, for example the fluoride or havy metal halide glasses developed during the past five or ten years, would be used appropriately in the longer wavelength infrared systems. Tapered crystals and crystal fibers would be substituted in those devices or systems employing single crystal fiber lasers or Fabry-Perot cavities. An important feature of the construction of the three embodiments is that the fiber radius is drawn gradually from some relatively larger area at an input end, 10a', 11a' or 12a' and 12d' to a smaller, tapered dimension 10b, 11b, or 12b and 12f, which can be as much as one order or up to several orders of magnitude smaller than the input dimension.

The contraction of the optical core is done in such a fashion that the dominant or fundamental mode (whether issuing directly from a laser or an adjacent-/fused fiber) is coupled into the larger radial end of the MFC and propagates to the smaller end of the MFC, retaining its integrity through the region of radial transitioning. In other words, the construction of the contracted fiber region is such that the optical energy propagates through adiabatically, as established in the Snyder et al. writing.

The mode field conditioners herein discussed are typically constructed by physical contraction of the waveguide radius by means of a controlled drawing process. However, it is conceivable that under certain conditions an advantage would accrue by appropriate variation of the index of refraction to achieve light concentration through the transition region.

The FIG. 2 arrangement can use differently sized tapers 11a and 11c to produce a desired intensity at 15''. For example, the taper 11a may enhance amplification of a frequency shifted component in 11b; such that the taper at 11c is custom designed to extract the mode-field of the longer wavelength light at 15''. The region indicated by 10, 11, or 12 may vary in length as desired to include: (1) multiple kilometered lengths of special fiber (i.e., birefringent or polarization preserving fiber) for obtaining an appropriate phase or polarization change, or (2) considerably longer lengths of fiber for long-haul transmission.

The transition region can be varied in stages, as shown in the embodiment of FIG. 3 with a tapered section 12a that is joined to another tapered section 12d along the area of 12d'. Multiple transitioning stages to achieve successively higher energy densities may be tailored to achieve a cascading effect of frequency conversions or successive chains of active nonlinear events. A particular example of multiple stages of light concentration may be constructed for long-haul transmission. The first and second MFC's are coupled or fused together or tapered in stages as the design requires.

Higher rates of concentration may be achieved by coupling more than one fiber or tapered fiber to another tapered fiber section in series, so that a desired intensity level at the smallest dimension of the last tapered fiber section is created.

Figure 4:
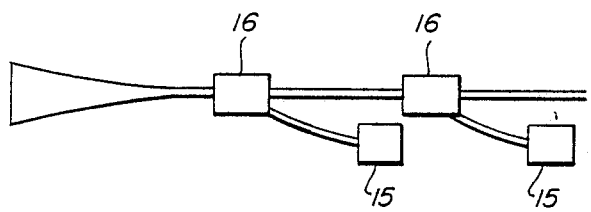
FIG. 4 shows a variation of this concept.

A portion of another conceivable nonlinear optical circuit arrangement constructed via MFC's is shown in FIG. 4. Several suitable couplers 16 can be used to tap-off different power ratios from a star-configured or T-coupled data bus, such that devices 15 may utilize the optical signal. In such optical data bus networks, especially designed MFC's are used at the output port of coupler 16 to establish the proper power density in the cylindrical segment of the MFC which connects 15 to 16, such that the appropriate nonlinear response occurs in the nonlinear optical device 15. Obviously, the devices 15 may be different one from another and may operate on the basis of various or different nonlinear optical effects. Consequently, the MFC's connecting respective devices 15 to couplers 16 may be different in design. Several examples of the use of MFC's in relation to nonlinear optical devices are now given.

An especially designed MFC may be used to couple a fiber-optic logic gate, based upon the intensity dependent polarization rotation in birefringent fiber, into an all-fiber circuit. The MFC would concentrate the input light in order to match the mode-field radius to an extremely small core birefringent fiber.

An MFC may also be specifically configured to induce self-phase modulation (SPM) of light pulses, such that advantages or improvements to a dual-core fiber nonlinear coupler can be obtained. Switching speeds of the latter will be limited by pulse dispersion; however, an active phase change in the MFC can neutralize the dispersion. Simultaneously, the light concentration obtained could allow device operation with several watts of power rather than 850 watts.

For MFC's constructed with tapered optical fiber, or other materials, exhibiting anomalous dispersion at the operational wavelength, the behavior of pulses propagating through the tapered region depends on the relative weight of the dispersive term and the nonlinear SPM term (from the intensity dependent index of refraction). By careful control of the MFC parameters, the frequency sweep due to nonlinear SPM gives rise to pulse narrowing. Manufacturing processes in forming the tapered region may create an exact balance to engender formation of an envelope soliton, which subsequently propagates without distortion in an appropriately designed (cylindrical) optical fiber.

The primary and essential distinction between the mode field conditioning devices in this invention in comparison to the tapered optical fibers discussed in the background literature is the following: the MFC's are dimensionally and materially designed and constructed in such a manner as to induce and/or enhance nonlinear optical effects. The MFC's are active devices in a nonlinear optical circuit. The conception of designing tapered dielectric waveguides such that they become active participants in the optical circuit represents a nontrivial generalization from the concept of passive tapered optical fiber for the purpose of fiber splicing. The following discussion and mathematical derivation demonstrates the feasibility of generating nonlinear optical effects arising from the proper design of a tapered dielectric waveguide.

The concept of mode-field conditioning encompasses all aspects of temporal and spatial reshaping of optical pulses to stimulate or enhance nonlinear optical effects. The use of a tapered single-mode fiber as a mode-field conditioner (MFC) produces a radial contraction of the optical signal energy resulting in an increased energy density within the fiber core. Since usually, optical energy is transmitted in pulse form to achieve higher energy densities, it is envisioned that the mode-field conditioner is most likely to be used in transmission systems that transfer energy in this form. However, continuous wave energy, as well as composite energy transfers, can benefit by the inclusion of the conditioner with associated transmission systems.

Pulse transitions remain single-mode by sufficiently gradual radial contraction in the MFC, such that energy concentration occurs adiabatically. The percentage of total pulse energy confined in the small end core is slightly reduced since the fiber "V" number decreases in proportion to the radius. However, by inclusion of the mode-field conditioner, pulses otherwise having energy densities insufficient to induce nonlinear effects in certain nonlinear devices may be coupled into the large diameter end of the MFC. Upon traversing the taper to the narrow end, the light intensity will be brought to a sufficient level to induce nonlinear transmission or effects in appropriately coupled nonlinear devices.

An adiabatic transition of the total field through the mode-field conditioner is composed of the fundamental pump and the Raman-shifted components and can be understood by an extension of the well-known coupled-mode theory, as set out D. Marcuse in his above cited article entitled "Mode Conversion in Optical Fibers with Monotonically Increasing Core Radius". The semi-classical description of stimulated Raman-scattering (SRS) implies that nonlinear polarizations can be written as source terms in Maxwell's equations. The background for this implication is well-established in the literature, for example, see Y. R. Shen's article entitled, "Stimualted Raman Scattering", in *Light Scattering in Solids*, Cardona M., (Springer-Verlag, Berlin, Heidelberg, N.Y., 1983), Chapter 7, pp. 283-286. Using restrictions associated with "weakly guiding" fibers, the transverse fields for the pump laser ($E^P$) and Stokes wave ($E^s$) must satisfy the following set of equations during transition through the region with greatly reduced radius:

$$-\left(\frac{1}{i\omega_P\mu_0}\right)\nabla_t \times (\nabla_t \times E^P) + \tag{1}$$

$$\left(\hat{e}_z \times \frac{\partial H^P}{\partial z}\right) = i\omega_P\epsilon_0 n_P^2 E^P + i\omega_P\chi_P|E^S|^2 E^P,\tag{2}$$

$$-\left(\frac{1}{i\omega_S\mu_0}\nabla_t \times (\nabla_t \times E^S)\right) +$$

$$\left(\hat{e}_z \times \frac{\partial H^S}{\partial z}\right) = i\omega_S\epsilon_0 n_S^2 E^S + i\omega_S\chi_S|E^P|^2 E^S,\tag{3}$$

$$\left(\frac{1}{i\omega_P\epsilon_0}\right)\nabla_t \times \left[\left(\frac{1}{n^2}\right)\nabla_t \times H^P\right] +$$

$$\left(\hat{e}_z \times \frac{\partial E^P}{\partial z}\right) = -i\omega_P\mu_0 H^P,$$

$$\left(\frac{1}{i\omega_S\epsilon_0}\right)\nabla_t \times \left[\left(\frac{1}{n^2}\right)\nabla_t \times H^S\right] + \tag{4}$$

$$\left(\hat{e}_z \times \frac{\partial E^S}{\partial z}\right) = -i\omega_S\mu_0 H^S.$$

Nonlinear polarizations have been included as source terms on the right-hand side of equations 1 and 2. The $\chi$'s are third-order nonlinear (Raman) susceptibilities, through which the equations are coupled by the product terms having squares of the E-field components. This nonlinear coupling causes energy transfer from the pump into Stokes component.

Field solutions are written by a superposition of "local normal modes" in accordance with the usual prescription. In view of the pump wave giving rise to a Stokes wave in the dominant mode (higher order Stokes are suppressed for simplicity), representative additional expansions are included, $$E^P = \sum_{\nu=1}^{N} a_\nu^P E_\mu^P, \quad E^S = \sum_{\nu=1}^{N} a_\nu^S E_\nu^S \tag{5a,b}$$

$$H^P = \sum_{\nu=1}^{N} b_\nu^P H_\nu^P, \quad H^S = \sum_{\nu=1}^{N} b_\nu^S H_\nu^S. \tag{6a,b}$$

The mode field expansions are substituted into equations (1)–(4), providing a set of integro-differential equations for the mode field amplitudes $a^P$, $a^s$, $b^P$, and $b^s$.

A transformation for slowly varying amplitudes results in the most convenient form of the integro-differential equations. It is in this form that the mode-coupling coefficients are explicitly revealed.

$$R_{\mu\nu}^P = \tag{7}$$

$$\frac{\omega_P\epsilon_0}{4P(\beta_\mu^P - \beta_\nu^P)} \int_{-\infty}^{\infty} \int_{-\infty}^{\infty} \frac{\partial n_P^2}{\partial z} E_\mu^{P*} \cdot E_\nu^P \, dx \, dy,$$

$$T_{\mu\nu}^P = \tag{8}$$

$$\frac{-\omega_P\chi_P}{4iP(\beta_\mu^P - \beta_\nu^P)} \iint_{Acore} \left|\sum_{\sigma=1}^{N} a_\sigma^S E_\sigma^S\right|^2 E_\mu^{P*} \cdot E_\nu^P \, dx \, dy,$$

$$R_{\mu\nu}^S = \tag{9}$$

$$\frac{\omega_S\epsilon_0}{4P(\beta_\mu^S - \beta_\nu^S)} \int_{-\infty}^{\infty} \int_{-\infty}^{\infty} \frac{\partial n_S^2}{\partial z} E_\mu^{S*} \cdot E_\nu^S \, dx \, dy,$$

$$T_{\mu\nu}^S = \tag{10}$$

-continued $$\frac{-\omega_S \chi_S}{4 i P(\beta_\mu{}^S - \beta_\nu{}^S)} \iint_{A_{core}} \left| \sum_{\sigma=1}^{N} a_\sigma{}^P E_\sigma{}^P \right|^2 E_\mu{}^{S*} \cdot E_\nu{}^S \, dx \, dy.$$

Backward traveling waves have been ignored, therefore sign conventions have been suppressed for simplicity. From this extension of coupled-mode theory to describe mode conversions of nonlinear pulses propagating through an MFC with gradual radial taper, conclusions can be arrived at.

A pump wave and an associated Stokes wave propagating in the fundamental waveguide mode experience adiabatic transition through the MFC, providing that radial reaction satisfies the appropriate "slowness criterion", note the above-cited Snyder article. Furthermore, unless periodic radial imperfections and/or refractive index inhomogeneities exist, power loss by coupling to higher-order modes will not occur. Stokes waves generated in the region of radial transition are induced to propagate in the dominant mode. The natural limitation to this class of light intensification phenomena, is likely associated with the balance between optical and material characteristics of the MFC itself. Eventually, by sufficient increase in pump intensity in a region of relatively small radius, the dominant mode will break out of core confinement to become a mode in the larger waveguide composed of bounded cladding.

An example of the usefulness of the MFC for nonlinear fiber optic transmission links is apparent via its implications for an optical fiber amplifier utilizing stimulated Raman scattering. The Raman amplification ($A_R$) is given by, $$A_R \approx \exp(gPl_{eff}/A), \quad (11)$$

where P is pump power, A the effective interaction area, $L_{eff}$ the effective interaction length, and g the Raman gain coefficient. Therefore, the amplification in such a nonlinear system is directly dependent on the energy density (P/A). Given a well-confined pulse within a single-mode fiber core, the effective interaction area is on the order of the core area given by $\pi a^2$ (with a equal to the core radius). An MFC with input diameter of 10 microns and an exit diameter of 5 microns, (achieved such that the fundamental mode transitions adiabatically), creates a fourfold decrease in effective interaction area (A). Consequently, a fourfold increase in the argument of the exponential function for Raman amplification occurs. Similarly, an MFC with an 8 micron input and an exit of 2 microns will provide a 16-fold increase in intensity. The use of similar MFC's to couple both the signal and pump beams, respectively, into a Raman amplifier, for example, will utilize both the improved coupling capability of the fiber tapers and the energy density conditioning required for efficient amplification in the subsequent fiber for signal amplification (FSA) having effective length $L_{eff}$. Implementation in the design of a field installable tapered fiber amplifier and an all-fiber stimulated four photon mixing (SFPM) amplifier [see for example co-pending U.S. patent applications referenced above] have created new designs and new capabilities for the optical and opto/electronic designer. Field compatible designs are completed by incorporating wavelength selective fused couplers for simultaneous launch of pump and signal into FSAs or SFPMs, respectively.

The new use of single-mode tapered dielectric waveguides, in general, and optical fiber tapers, in particular, to condition the pulse energy-density for stimulating and enhancing nonlinear effects in fibers for transmission provides new capabilities and tools for extensive improvement in the state of the art. The enhancement of SRS via mode-field radial contraction, as mentioned above, does not preclude the specific design pf MFC's for enhancing stimulated four photon mixing, stimulated Brillouin scattering, or other nonlinear interactions where high energy density is desirable.

A typical single-mode fiber used for transmission of energy over long distances has an eight-micron core and MFC is tapered to a diameter of about a 2 micron core so that the energy incident on the MFC is intensified per unit volume of about sixteen times the energy density which enters it. Since most nonlinear optical effect devices operate on the basis of a spot intensity, as opposed to the total incident energy, this intensification stimulates and enhances the nonlinear effect of the nonlinear device. If the energy density threshold of the optical fiber is above the Raman threshold, then a frequency shift may result from stimulated Raman scattering. If the nonlinear devices are chosen to be responsive to the frequencies of the stimulated Raman scattering, then appropriate actuation of the device will ensue. This is but one example of the new capabilities afforded by the MFC. It is to be noted that other nonlinear effects mentioned above may be drawn upon when other signal enhancements are called for. Tapered fiber crystals and single crystal fibers have advantages that beneficially adapt to the MFC concept.

Obviously, many modifications and variations of the present invention are possible in light of the above teachings. It is therefore to be understood that within the scope of the appended claims, the invention may be practiced otherwise than as specifically described.

What is claimed is:

1. A method of conditioning optical signal energy for stimulating and enhancing nonlinear effects in dielectric waveguides for transmission comprising:
   transmitting optical signal energy through a single-mode dielectric waveguide;
   reducing the diameter of the single mode dielectric waveguide in a tapered section so as to retain single-mode transmission from a larger diametered end receiving the optical signal energy to a smaller diametered end; and
   concentrating the intensity of the coupled optical signal energy at the smaller diametered end of the single mode dielectric waveguide as it transits the length of the tapered single-mode dielectric waveguide section from the larger diametered end to the smaller diametered end to provide a sufficient intensity level that induces an appropriate nonlinear effect.

2. A method according to claim 1 further including:
   an optical coupling of a separate tapered single-mode dielectric waveguide section to the single-mode dielectric waveguide.

3. A method according to claim 1 in which the optical signal energy is pulsed energy.

4. A method according to claim 2 in which the dielectric waveguide is an optical fiber.

5. A method of conditioning optical signal energy for stimulating and enhancing nonlinear effects in dielectric waveguides for transmission comprising:

transmitting optical signal energy through a single-mode dielectric waveguide;

reducing the diameter of the single mode dielectric waveguide in a tapered section so as to retain single-mode transmission from a larger diametered end receiving the optical signal energy to a smaller diametered end; and concentrating the intensity of the coupled optical signal energy at the smaller diametered end as it transits the length of the tapered single-mode dielectric waveguide section from the larger diametered end to the smaller diametered end thereby providing a sufficient intensity level that is useable for actuation of an appropriate nonlinear device, the concentrating includes the actuation of a nonlinear device.

6. A method according to claim 5 in which the dielectric waveguide is an optical fiber.

7. A method according to claim 5 in which the dielectric material is a single crystal material.

8. A method of conditioning optical signal energy for stimulating and enhancing nonlinear effects in dielectric waveguides for transmission comprising;

transmitting optical signal energy through a single-mode dielectric waveguide;

reducing the diameter of the single mode dielectric waveguide in a tapered section so as to retain single-mode transmission from a larger diametered end receiving the optical signal energy to a smaller diametered end; and concentrating the intensity of the coupled optical signal energy at the smaller diametered end as it transits the length of the tapered single-mode dielectric waveguide section from the larger diametered end to the smaller diametered end thereby providing a sufficient intensity level that is useable for actuation of an appropriate nonlinear device, the concentration includes the rotation of the polarization of the optical signal energy.

9. A method according to claim 8 in which the dielectric waveguide is an optical fiber.

10. A method according to claim 8 in which the dielectric material is a single crystal material.

11. A method of conditioning optical signal energy for stimulating and enhancing nonlinear effects in dielectric waveguides for transmission comprising:

transmitting optical signal energy through a single-mode, single crystal material dielectric waveguide;

reducing the diameter of the single mode dielectric waveguide in a tapered section so as to retain single-mode transmission from a larger diametered end receiving the optical signal energy to a smaller diametered end; and concentrating the intensity of the coupled optical signal energy at the smaller diametered end of the singel mode dielectric waveguide as it transits the length of the tapered single-mode dielectric waveguide section from the larger diametered end to the smaller diametered end to provide a sufficient intensity level that induces an appropriate nonlinear effect.

12. A method of conditioning optical signal energy for stimulating and enhancing nonlinear effects in dielectric waveguides for transmission comprising:

transmitting optical signal energy through a singel-mode, single crystal material dielectric waveguide;

reducing the diameter of the single mode dielectric waveguide in a tapered section so as to retain single-mode transmission from a larger diametered end receiving the optical signal energy to a smaller diametered end;

concentrating the intensity of the coupled optical signal energy at the smaller diametered end of the single mode dielectric waveguide as it transits the length of the tapered single-mode dielectric waveguide section from the larger diametered end to the smaller diametered end to provide a sufficient intensity level that induces an appropriate nonlinear effect; and an optical coupling of a separate tapered single-mode dielectric waveguide section to the single-mode dielectric waveguide.

* * * * *